(12) United States Patent
Kampmann (10) Patent No.: US 6,401,664 B1
(45) Date of Patent: Jun. 11, 2002

(54) APPARATUS FOR DRYING ANIMALS

(75) Inventor: Heinrich Kampmann, Lingen (DE)

(73) Assignee: Kampmann GmbH, Lingen (DE)

( * ) Notice: Subject to any disclaimer, the term of this patent is extended or adjusted under 35 U.S.C. 154(b) by 0 days.

(21) Appl. No.: 09/503,539

(22) Filed: Feb. 14, 2000

(30) Foreign Application Priority Data

Feb. 23, 1999 (DE) ......................................... 199 07 876

(51) Int. Cl.⁷ ............................................. A01K 29/00
(52) U.S. Cl. ..................... 119/606; 119/668; 119/677; 34/523
(58) Field of Search ................................ 119/416, 652, 119/667, 668, 669, 677, 602, 606; 34/523, 524, 549

(56) References Cited

U.S. PATENT DOCUMENTS

| | | | |
|---|---|---|---|
| 2,898,691 A | * 8/1959 | Moseman et al. | ............. 34/231 |
| 3,884,191 A | 5/1975 | Stout | ........................... 119/671 |
| 3,985,102 A | * 10/1976 | Yonezawa | .................... 119/416 |
| 4,505,229 A | * 3/1985 | Altissimo | .................... 119/668 |
| 4,934,069 A | 6/1990 | Kaegi | ............................ 34/523 |
| 5,007,182 A | * 4/1991 | Fishman et al. | ................ 34/90 |
| 5,036,601 A | * 8/1991 | Mulle et al. | .................... 34/97 |
| 5,140,947 A | * 8/1992 | Bruce | .......................... 119/677 |
| 6,058,886 A | * 5/2000 | Haines | ......................... 119/601 |

FOREIGN PATENT DOCUMENTS

| | | | |
|---|---|---|---|
| DE | 27 11 222 | 9/1978 | .......... A01K/13/00 |
| EP | 0 316 756 B1 | 3/1993 | .......... A01K/13/00 |
| GB | 2 137 466 | 10/1984 | ............. A01K/1/00 |
| GB | 2 144 317 | 3/1985 | .......... A01K/1/035 |
| GB | 2144317 A | * 3/1985 | ................. 119/668 |

OTHER PUBLICATIONS

Deutches Patent–und Markenamt (German patent and Trademark Office Search Report mentioning Document K1 above).

* cited by examiner

*Primary Examiner*—Charles T. Jordan
*Assistant Examiner*—John W Zerr
(74) *Attorney, Agent, or Firm*—Technoprop Colton LLC

(57) ABSTRACT

Up until now, the task of rubbing animals, in particular horses, ponies or the like, dry once they have been washed (showered) has involved strenuous manual work. The effort involved in this rubbing-dry action means that the horses are often dried insufficiently and this results, in particular, in them catching chills. The invention proposes an apparatus for drying animals which has a housing (11) with air-outlet openings on the underside (16). The housing (11) is assigned fans (39), for generating an air flow, and air-distributing plates (45), as a result of which a uniform air stream is generated. This uniform air stream is heated by flowing along plate convectors (33) and then passes out of the housing (11) at the bottom as hot air through both air-outlet holes (21) and air-outlet slits (28). A hot-air flow generated in this way makes it possible for animals, in particular horses, to be dried carefully and effectively.

33 Claims, 9 Drawing Sheets

APPARATUS FOR DRYING ANIMALS

BACKGROUND OF THE INVENTION

The invention relates to an apparatus for drying animals, in particular horses, ponies or the like.

Animals, horses in particular, are often washed or showered. In particular horses used for sport have to be showered following the day's training. Then, in order to avoid chills, pneumonia or similar ailments, the horses have-to be dried carefully. It is essential here for this drying operation to take place not just on the surface of the back or the sides, but also beneath the belly in particular, this constituting a problem area.

Drying methods which have been known up until now have involved first of all moisture being stripped off horses using scrapers (the surface water is thus removed) and then the horses being covered by a sweat blanket. The problem area of the belly is thus not reached. The abovementioned method of drying involves considerable outlay and effort and therefore usually takes place merely to an insufficient extent.

The object of the invention, then, is to provide an apparatus by means of which animals, in particular horses, ponies or the like, can be dried easily, reliably, cost-effectively and carefully in a short period of time.

BRIEF SUMMARY OF THE INVENTION

An apparatus for achieving this object comprises a housing which has air-outlet openings on an underside and in which there are arranged at least one air-flow generator and at least one air-distributing means. Since a housing of the apparatus is provided with air-outlet openings on its underside, a compact apparatus is produced. This is because, in particular, the air-outlet openings may be an integral constituent part of the housing. Furthermore, the housing protects the air heaters arranged therein.

Moreover, the animals which are to be dried are protected from being influenced directly by the air heaters. At least one air-distribution means in the housing ensures that the hot air serving for drying purposes is distributed uniformly over all the air-outlet openings, which also results in the air passing out of the housing in a noise-free manner. It is important for the air to pass out in a noise-free manner in order that the animals do not develop a fear of drying and, instead, regard drying as a pleasant experience.

A further apparatus for achieving the object mentioned in the introduction comprises a housing, means arranged in the housing that are intended for generating an air stream, and air-outlet openings in an underside of the housing, air which passes out of the air-outlet openings forming, beneath the housing, a drying space for the animal which is to be arranged at least in part beneath the housing. By way of the drying space beneath the housing, in which the dry animal is arranged at least in part, the air serving for drying purposes reaches all the sides, to be precise even critical areas, of the animal without obstruction.

A preferred configuration of the invention provides for the or each air-distributing means to be arranged upstream of the air heaters, as seen in the flow direction. In this way, the air coming from the air-flow generators is guided past the air heaters in a uniformly distributed manner, as a result of which hot air passes out of the air-outlet openings in a uniformly distributed manner and at essentially the same temperature. This achieves uniform drying and, at the same time, prevents the situation where many areas of the animal which is to be dried in each case are dried with excessively cold air, which could lead to draughts and the animal suffering from ailments resulting therefrom. Uniform heating of the air makes it possible for the temperature of the hot air flowing out of the apparatus to be controlled reliably by a small number of temperature sensors or even just by one temperature sensor.

In the simplest case, the air-distributing means are designed as air-distributing plates which extend over all or some of the air heaters. The air-distributing plates have perforations for the through-passage of the air. The perforations are preferably formed for through-passage holes which are distributed uniformly over the surface of the air-distributing plates and have any desired cross section. The through-passage holes may be round, polygonal, oval or elliptical.

In a preferred configuration of the apparatus, the base wall of the housing is provided with different air-outlet openings. It is preferable for opposite longitudinal-border regions of the base wall of the housing to be provided with elongate air-outlet slits. It is sufficient if one air-outlet slit is provided in each of the two longitudinal-border regions of the base wall. The air-outlet slits generate, on opposite sides of the apparatus, sheet-like hot-air curtains which screen the hot air, in particular the hot air passing out of the air-outlet openings arranged between the air-outlet slits, from the ambient air, as a result of which it is possible for the animals to be dried from their back to their feet with hot air.

The air-outlet openings arranged in the region between the air-outlet slits of the base wall are preferably designed as air-outlet holes. The air-outlet holes are expediently distributed uniformly on the region of the base wall between the opposite air-outlet slits. The base wall of the housing is thus of sieve-like design between the elongate air-outlet slits. The air-outlet holes are dimensioned and spaced apart such that an essentially continuous veil of hot air passes out in the region of the air-outlet holes, that is to say between the elongate air-outlet slits, and fills the space between the lateral air curtains formed by the elongate air-outlet slits, with the result that the hot air can flow over the animal, from the apparatus, to the ground and the animal is dried completely in the process by a uniform hot-air stream. In this case, the hot air flows past the animal uniformly from top to bottom. Hot air which has accumulated moisture and has possibly been cooled can flow out via the air-curtain-free end sides of the drying space formed between the lateral air curtains.

In a preferred configuration of the invention, the air heaters are designed as convectors, to be precise plate convectors in particular. Such air heaters have proven successful in heating engineering. Plate convectors are suitable for use in the apparatus for drying animals, in particular, because their heat exchanger plates have a comparatively large surface area for heating the air flowing past it and, furthermore, the plates of the convectors help to even out and calm the air flow. It is preferably to provide a plurality of elongate plate convectors which are oriented parallel in the longitudinal direction of the apparatus and are arranged closely to one another without actually being in contact. This achieves uniform heating of the air over the entire region of the base wall of the apparatus. The base wall is located just beneath the adjacent convectors, as seen in the flow direction of the air, with the result that, once it has flowed past the convectors, the heated air can immediately flow up out of the apparatus without any significant energy losses.

The energy transfer medium (for example hot water) is fed to all the convectors via a common hot-water supply. For this purpose, in terms of flow, the convectors are arranged in parallel. However, it is also conceivable to provide a plurality of flow lines and thus for various groups of convectors arranged in parallel to be supplied with a heat transfer medium. For example, the convectors assigned to the elongate air-outlet slits may be assigned to a separate hot-water flow means, while the rest of the convectors, which are assigned to the air-outlet holes, may be supplied with heat energy jointly via a further hot-water flow means.

Cooled heat transfer medium is preferably discharged from the convectors in exactly the same way as hot heat transfer medium is fed. Further provision is made here for the supply to be assigned to a bottom half of the convectors, oriented towards the air-outlet openings, while the return is assigned to a top half of the convectors. This results in two-stage heating of the air, that is to say first of all preheating at the top, colder half of the convectors and then further heating at the bottom, hotter half of the convectors. The temperature difference between the air which is to be heated and the heat transfer medium in the convectors is evened out as a result, the top, cold air still being heated by the residual energy of the heat transfer medium in the convectors and better utilization of the heat energy of the heat transfer medium being achieved as a result.

It is conceivable for the convectors assigned to the air-outlet holes to be arranged wholly or in part in at least one chamber which forms surrounding upright side walls, connected to the base wall of the housing, around the convectors assigned to the air-outlet holes. This prevents air exchange with the convectors assigned to the lateral air-outlet slits, as a result of which the elongate air-outlet slits may be fed air, if appropriate, under a greater pressure in order to produce a more stable air curtain on opposite sides of the apparatus. In contrast, the air can pass out of the air-outlet openings at lower pressure, as a result of which this air, acting directly on the body of the animals, has a lower flow speed. This reliably avoids the situation where the animals are exposed to a draught.

Provision is further made for arranging one or preferably more air-flow generators, in particular fans, on or in the housing. The fans are preferably arranged on the top side of the housing, to be precise either within the same or outside on a top wall of the housing. Air taken in from the outside (cold air) is then fed directly into the housing by the fans. The number, size and power of the fans is adapted to the air pressure which is to produced in the interior of the housing and/or the speed at which the heated air serving for drying purposes flows out of the apparatus.

Alternatively, it is possible for the air-flow generators, in particular fans, to be arranged outside the housing, to be precise at a distance from the same. The air flow generated by the fans is then led into the housing via air-feed ducts such as pipes or tubes. This means that the fans may be placed in some other location, to be precise at such a distance away that only a very small amount of fan noise, if any at all, occurs in the region of the actual apparatus. The apparatus thus operates in a particularly noise-free manner, which means that the animals are not exposed to any significant noise development during drying. Such an apparatus is particularly suitable for frightened animals.

It is also conceivable to use other conventional air generators, for example compressors, in order to produce an air flow. On account of the fact that they develop more noise than fans, these compressors are always placed at a location remote from the apparatus, with the result that the air flow generated or else compressed air passes to the apparatus via a corresponding line system.

A preferred exemplary embodiment of the apparatus according to the invention is explained in more detail hereinbelow with reference to the drawing, in which:

DETAILED DESCRIPTION OF THE PREFERRED EMBODIMENTS

Figure 4:
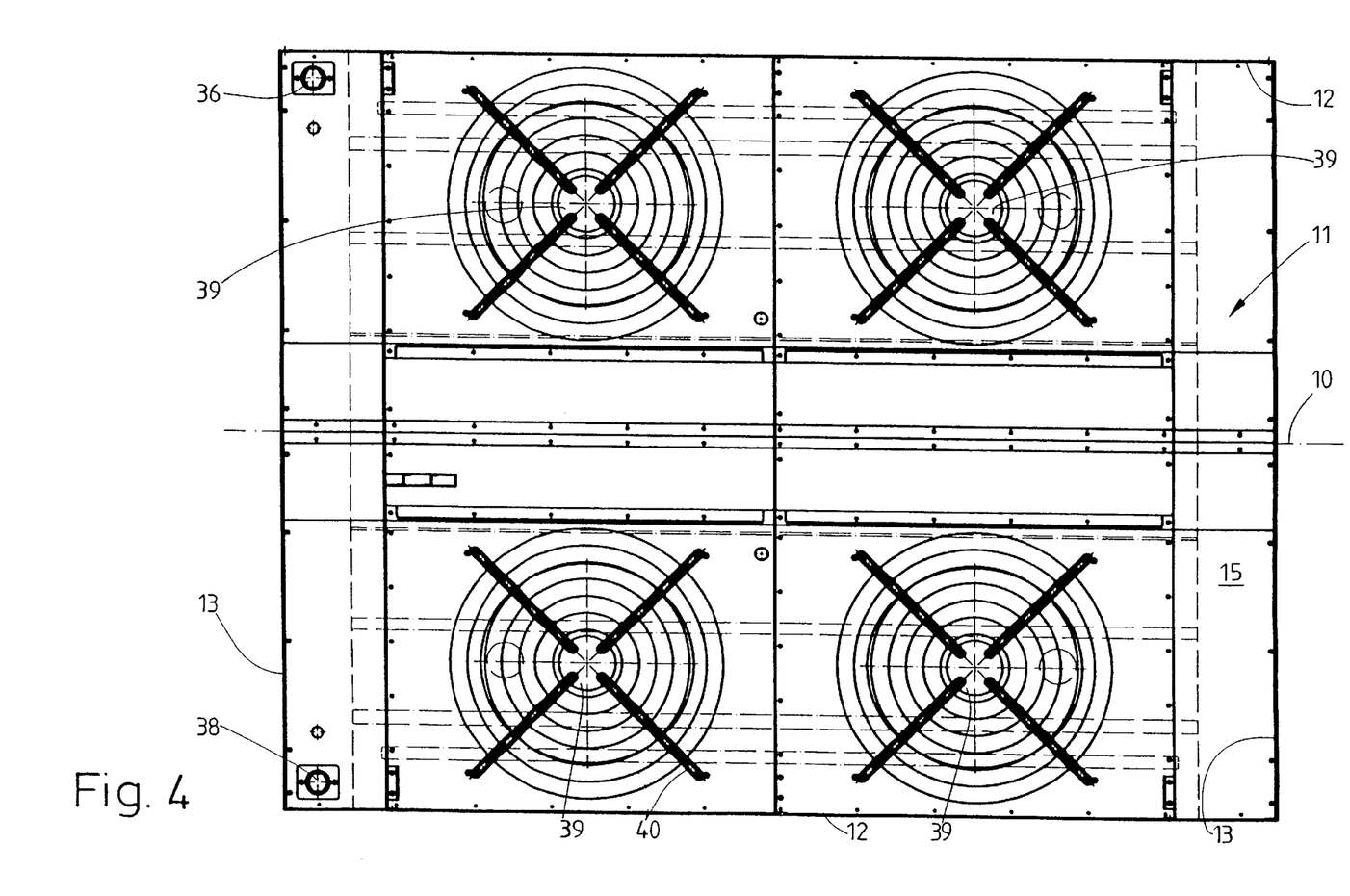
FIG. 4 shows a plan view of the apparatus.
Figure 5:
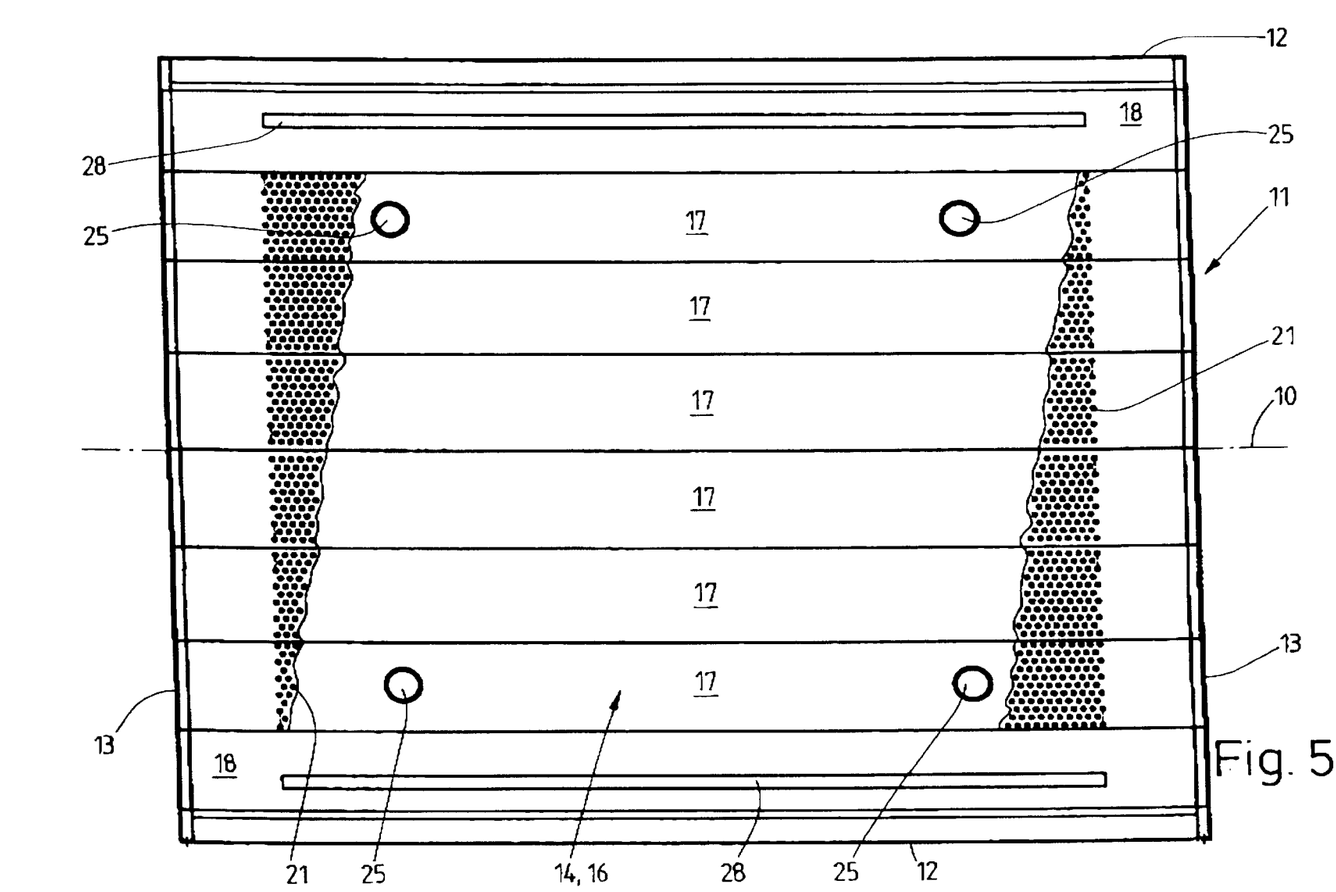
FIG. 5 shows a view of the apparatus from beneath.

The apparatus shown in the figures serves for drying horses. The apparatus is suspended in space, to be precise at a level at which it is located at a small distance above the horse's back. The horse's head is thus located in front of the apparatus. The horse is centrally beneath the apparatus, to be precise in relation to a central longitudinal axis 10 of the apparatus (FIGS. 4 and 5).

The apparatus has a box-like housing 11 with parallel, upright side walls 12, likewise parallel and upright end walls 13, a curved base wall 14 and a curved top wall 15. The base wall 14 and the top wall 15 are curved approximately equally in one direction, to be precise in the direction transverse to the longitudinal axis 10, and this curvature is such that it slopes up towards the centre. The base wall 14 thus has a concave curvature, as seen from an underside 16. The top wall 15 runs approximately parallel to the base wall 14. The concave curvature of the underside 16 of the base wall 14 means that the housing 11 is positioned part of the way round the horse from above.

The base wall 14 of the housing 11 is formed from base panels 17 and 18 which are arranged one beside the other without any gaps between them. The base panels 17 and 18 run continuously in the longitudinal direction of the housing 11, that is to say they are aligned parallel to the longitudinal axis 10. In the exemplary embodiment shown, the base wall 14 is formed from six inner base panels 17 and two outer base panels 18. The two outer base panels 16 are arranged on opposite sides of the group of six inner panels 17 and thus form outer longitudinal-border regions of the housing 11.

Figure 1:
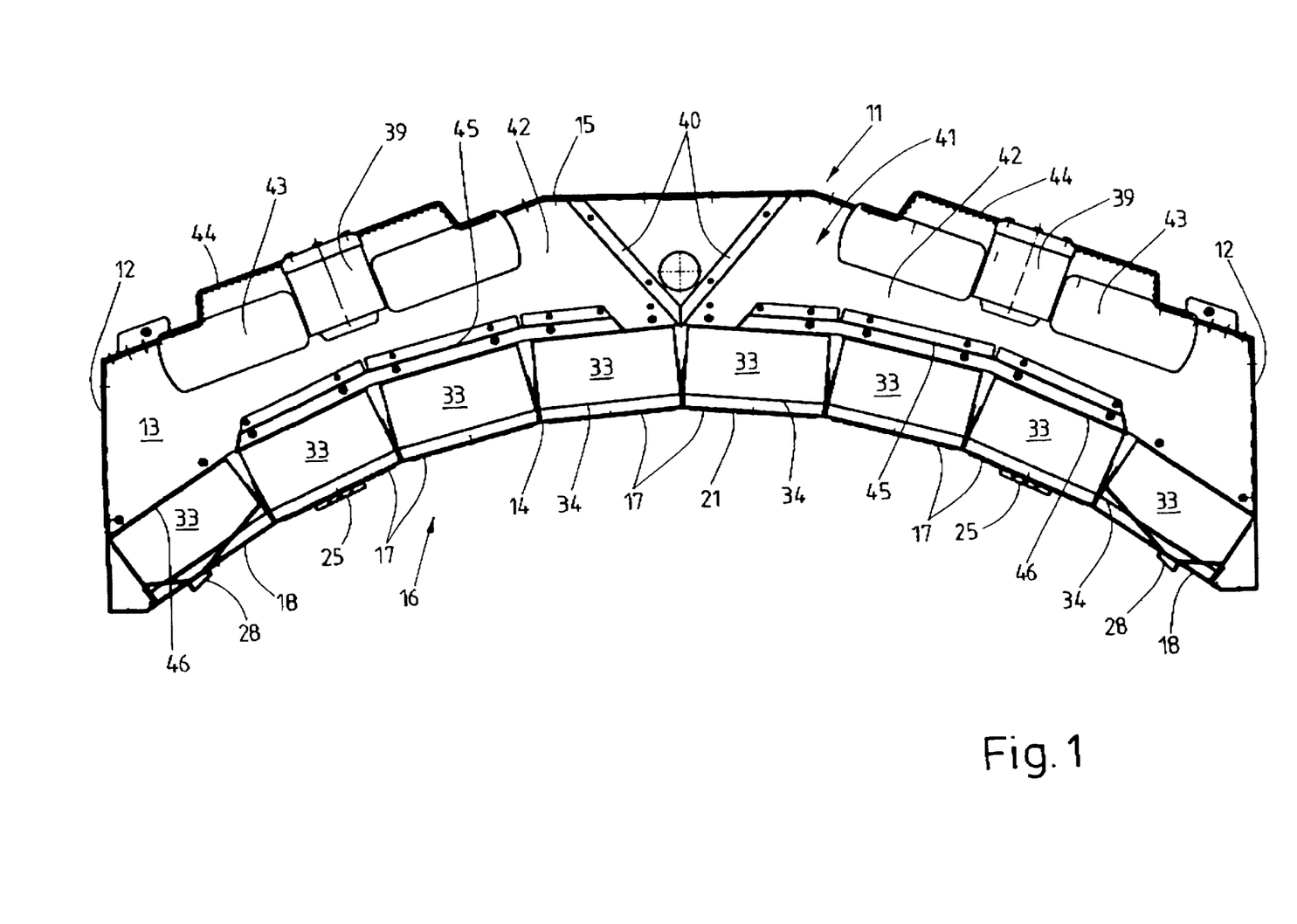
FIG. 1 shows a cross section through the apparatus.
Figure 2:
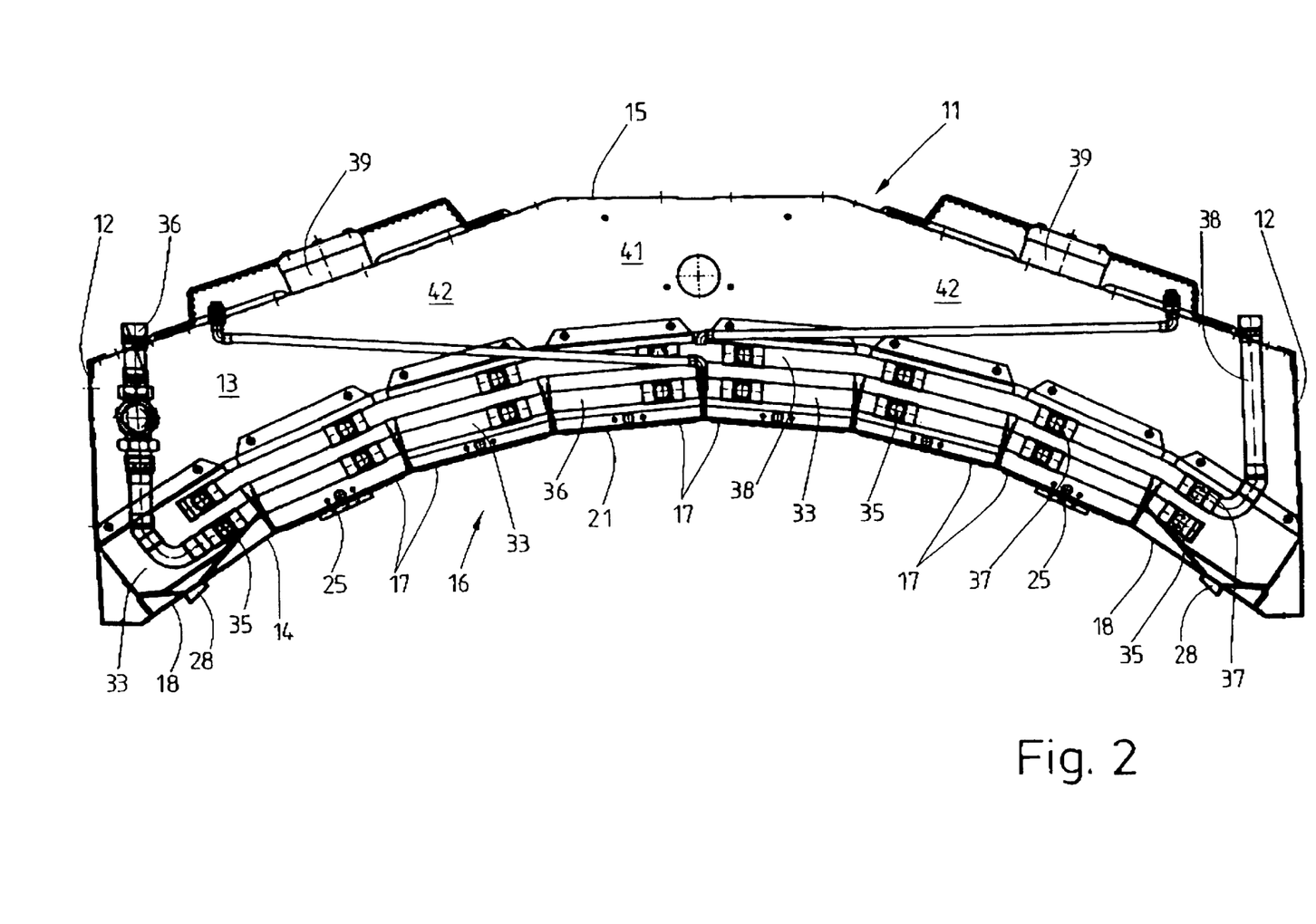
FIG. 2 shows an end view of the apparatus without an end wall of a housing of the same.
Figure 3:
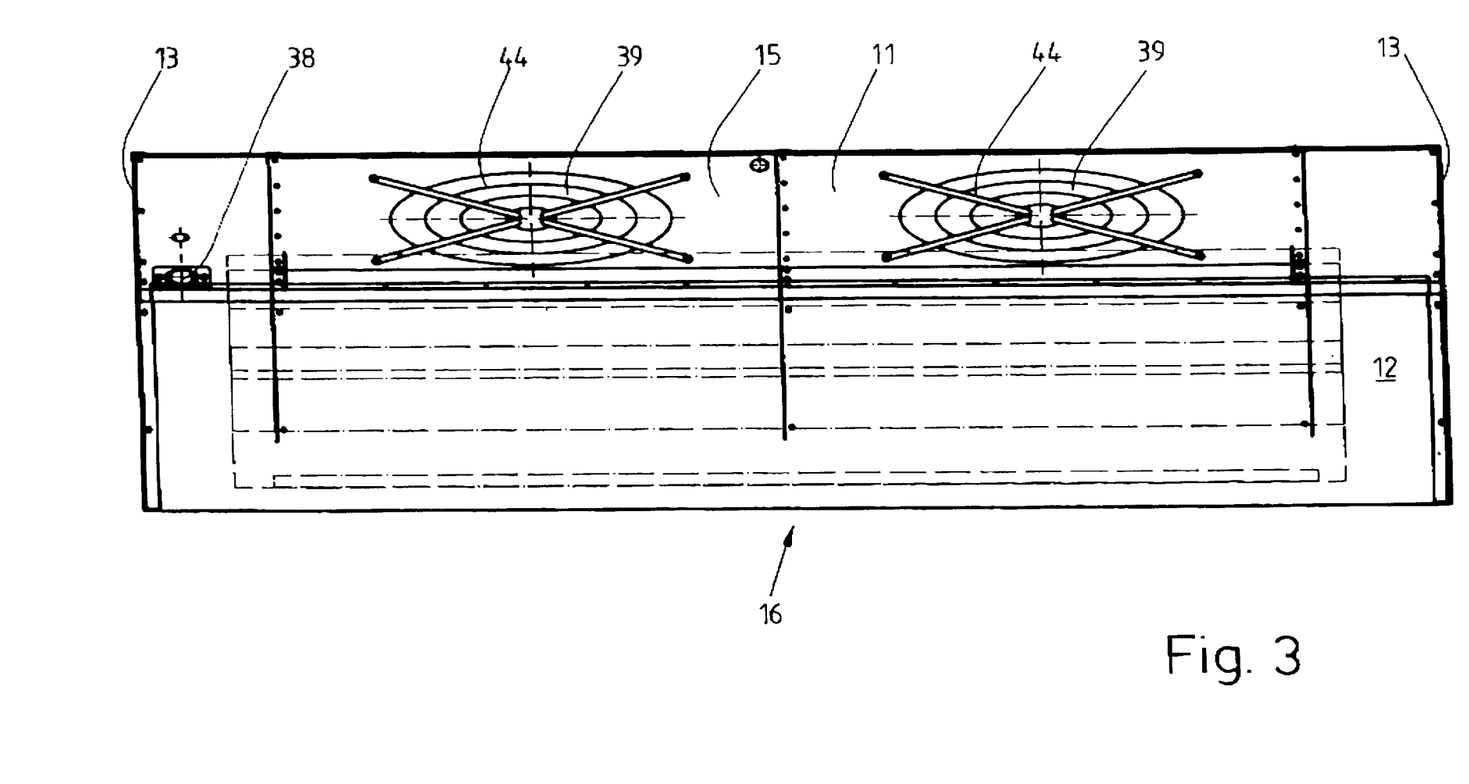
FIG. 3 shows a side view of the apparatus.
Figure 7:
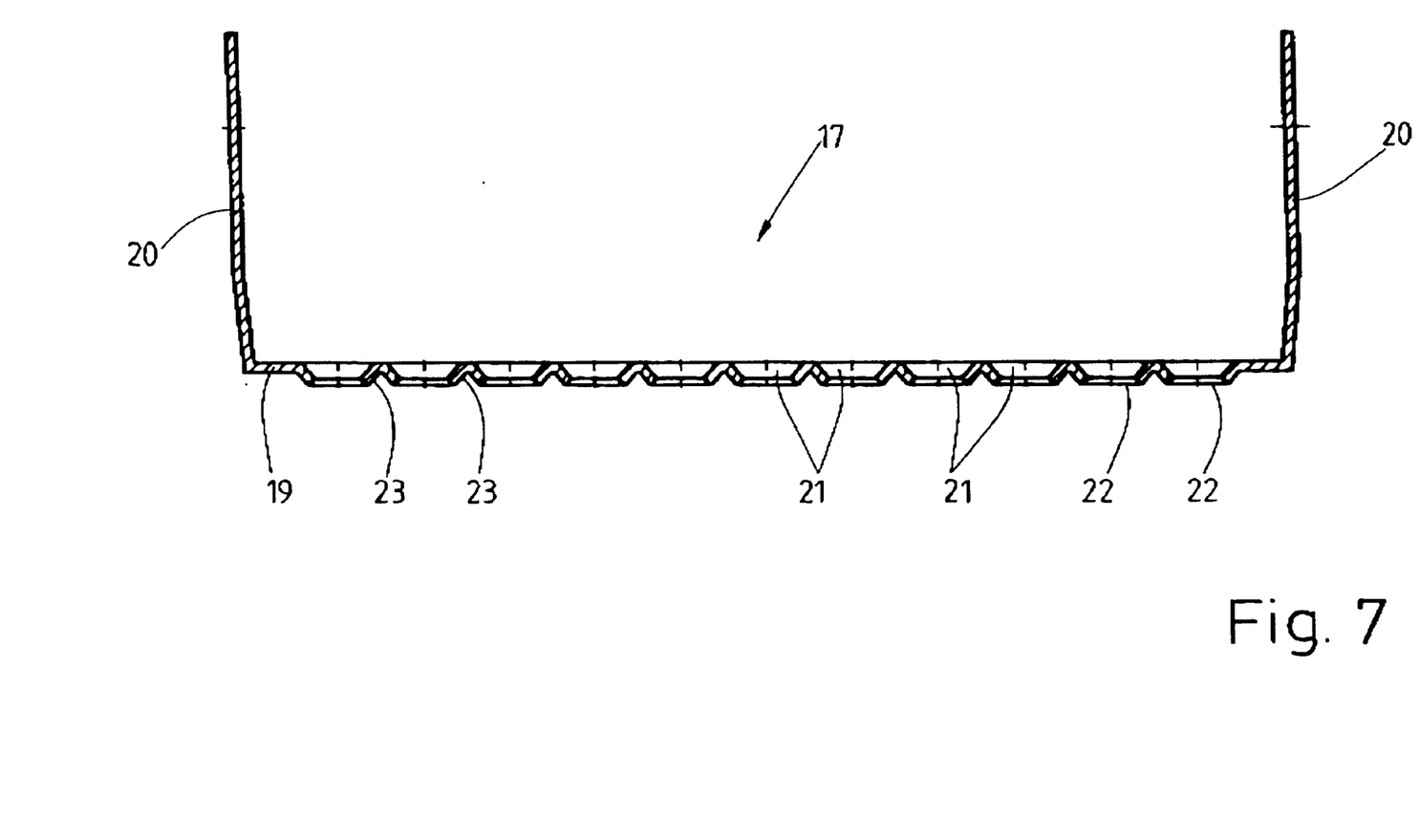
FIG. 7 shows an enlarged cross section through the base panel of FIG. 6.
Figure 8:
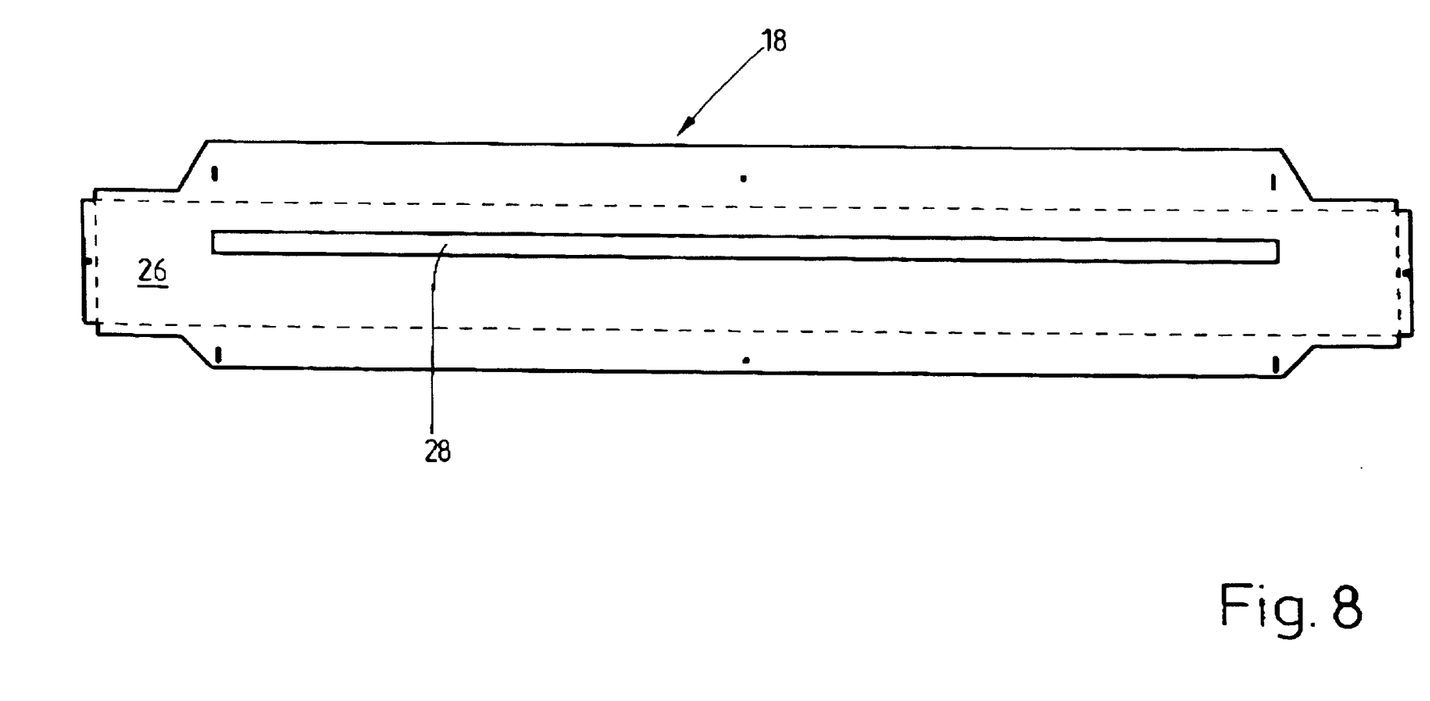
FIG. 8 shows a planar blank of a base panel with an elongate air-outlet slit in a view from beneath analogous to FIG. 5.

Each of the inner base panels 17, which are of identical design, have a planar base surface and two parallel side surfaces 20 extending from opposite longitudinal borders of the base surfaces 19. The parallel side surfaces 20 run at right angles to the base surface 19 and are oriented in the direction of the interior of the housing 11 (FIGS. 1 and 7). The entire base surface 19 of the base panel 17, or at least most of said base surface, is provided with air-outlet openings, to be precise air-outlet holes 21. The air-outlet holes 21 are distributed in a grid-like manner on the base surface 19, as a result of which the latter has a sieve-like character. All the air-outlet holes 21 are of the same design.

They have a round opening 22 which is then closed by a conical wall 23. By way of the conical wall 23, the openings 22 of the air-outlet holes 21 project downwards in relation to the underside 16 of the base wall 14 of the housing 11. The distance between adjacent air-outlet holes 21 is approximately double the diameter of an opening 22. The height of the frustoconical wall 23 is approximately half the size of the diameter of the opening 22 (FIG. 7).

Figure 6:
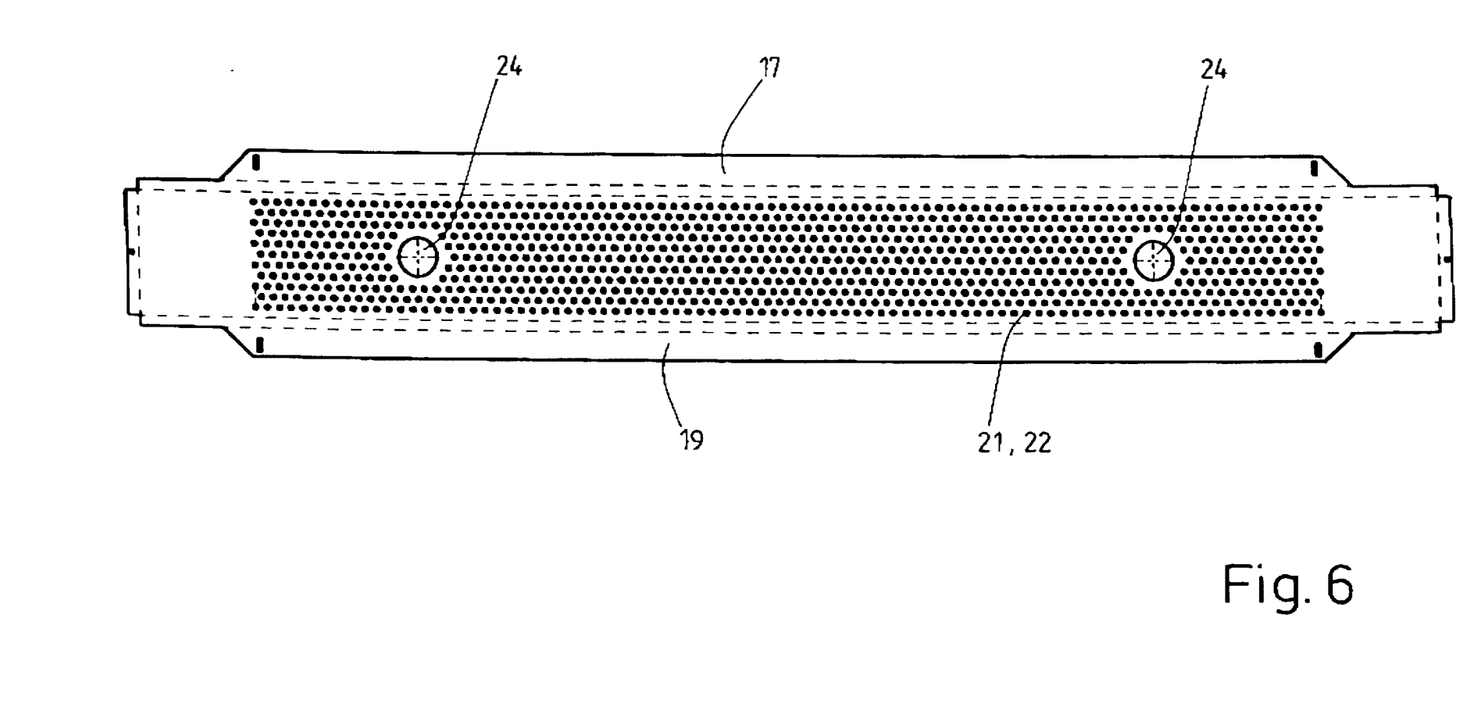
FIG. 6 shows a planar blank of a base panel with air-outlet holes in a view from beneath analogous to FIG. 5.

The base panel 17 of FIG. 6 has two relatively large cylindrical holes 24. Each of these holes 24 serves for receiving a built-in light 25. In the exemplary embodiment shown, it is only the two outer base panels 18 which are provided with in each case two built-in lights 25 (FIG. 1). The four base panels 17, located therebetween, do not have any built-in lights 25. It is possible for the built-in lights 25 to be placed elsewhere in the base wall 14 of the housing 11.

Figure 9:
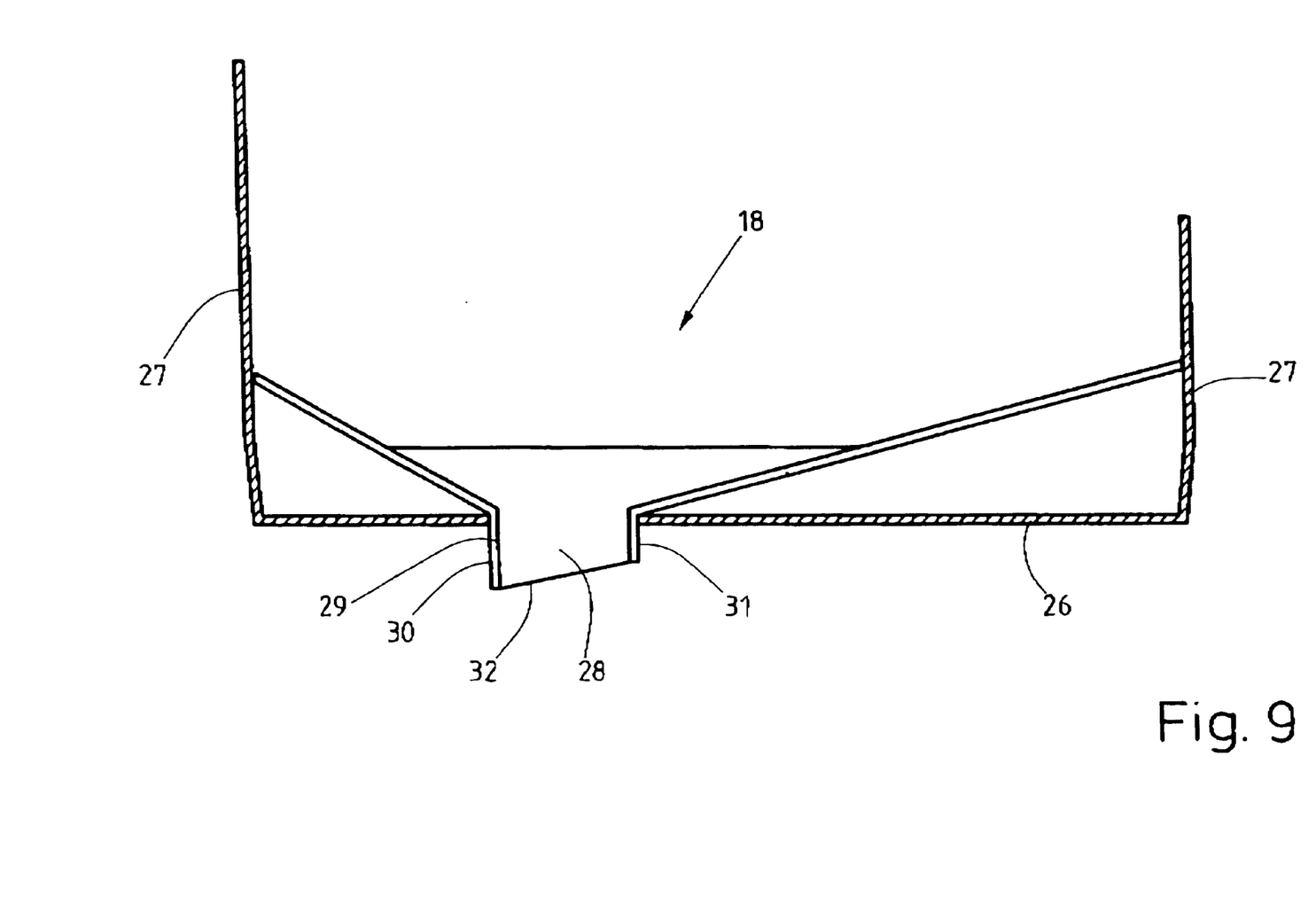
FIG. 9 shows an enlarged cross section through the base panel of FIG. 8.

The outer base panels 18 are designed similarly to the base panels 17. The base panels. 18 also have a planar, rectangular base surface 26 and two side surfaces 27 which are angled at right angles in relation to the borders of said surface. The side surfaces 27 are also oriented in the direction of the interior of the housing 11. The base surface 26 of each base panel 18 has a single air-outlet opening, namely an elongate air-outlet slit 28. Each air-outlet slit 28 runs parallel to the longitudinal axis 10 of the housing 11, to be precise over virtually the entire length of the base surface 26 of the base panel 18. The elongate air-outlet slits 28 are enclosed by a surrounding wall 29, which extends perpendicularly to the plane of the base surface 26. The wall 29 projects downwards in relation to the base surface 26 of the base panel 18, and is thus oriented out of the housing 11. Parallel, elongate side surfaces 30, 31 of the wall 29 are of different lengths. The outer side surface 30, which is oriented in the direction of the respective side wall 12 of the housing 11, is longer than the inner side surface 31, which is oriented in the direction of the longitudinal centre axis. A bottom, free border of the surrounding wall 29 thus encloses an elongate opening 32 of the air-outlet slits 28, this opening running obliquely in relation to the plane of the base surface 26, to be precise such that the angle of the plane of the opening 32 in relation to the side wall 12 of the housing 11 is more acute than the angle of the base surface 26 (FIGS. 1 and 9). By virtue of a mirror-inverted arrangement of the walls 29 of the air-outlet slits 28 of the opposite outer base panels 18, the air curtains passing out of the opposite air-outlet slits 28 converge in the direction of the ground. The air curtains thus form a space which decreases in the direction of the ground and is intended for guiding the hot air passing out of the air-outlet holes 21 of the base panels.

The base panel 17 of FIG. 6 has two relatively large cylindrical holes 24. Each of these holes 24 serves for receiving a built-in light 25. In the exemplary embodiment shown, it is only the two outer base panels 17 which are provided with in each case two built-in lights 25 (FIG. 1). The four base panels 17, located there between, do not have any built-in lights 25. It is possible for the built-in lights 25 to be placed elsewhere in the base wall 14 of the housing 11.

The apparatus also has a plurality of air heaters arranged in the interior of the housing 11. In the apparatus shown here, the air heaters are designed as convector heaters, to be precise plate convectors 33 in particular. Each base panel 17 and 18 is assigned an elongate plate convector 33. All the plate convectors 33 are designed identically to one another. Each plate convector 33 is arranged, and fastened, in the relevant base panel 17 or 18, between the side surfaces 20 and 27, respectively, of the same. The side surfaces 20 or 27 are of a length which extends approximately over half the height of the respective plate convector 33 and thus screens the bottom half of the same laterally and consequently forms chambers for receiving in each case one plate convector 33. The plate convectors 33 are arranged in the base panels 17 and 18 such that undersides 34 of the plate convectors 33 terminate at a small distance above the base surfaces 19 or 26 of the base panels 17, 18, respectively (FIG. 1). In this case, the undersides 34 of the plate convectors 33 run parallel to the base surfaces 19, 26 of the base panels 17, 18. The heat exchanger surfaces of the plate convectors 33, said surfaces not being shown in the figures, run perpendicularly to the base surfaces 19, 26 of the base panels 17 and 18, to be precise transversely to the longitudinal axis 10 of the housing 11.

All the plate convectors 33 have on an end side, in their bottom region, a connection stub 35 for a single flow line 36. The flow line 36 is connected to the connection stubs 35 of all the plate convectors 33. The same end surfaces of the plate convectors 33, said end surfaces being oriented in the direction of an end wall 13 of the housing 11, have, in their top region, in each case one further connection stub 37 for a common return line 38. It is also the case that the connection stubs 37 of all the plate convectors 33 are connected to the single return line 38. This means that all the plate convectors 33 are arranged in parallel. Via the flow line 36, all the plate convectors 33 are supplied simultaneously in their bottom region with not-yet-cooled heat transfer medium, in particular hot water. This flows through the bottom region of all the plate convectors 33. Arranged on the end sides located opposite the flow line 36 and the return line 38 are overflow lines (not shown in the figures) through which the hot water is led from a bottom half into the top half of the plate convectors 33 and, in the top half of the plate convectors 33, flows back to the common return line 38. From the latter, the cooled water is discharged in order to be reheated.

Arranged in the top wall 15 of the housing 11 are air-flow generators, these being fans 39 in the exemplary embodiment shown. In the present case, the apparatus has four fans 39. In each case two fans 39 are spaced apart on different sides of the top wall 15 (FIG. 4). Arranged between the two fans 39 on each side of the top wall 15 is a partition wall 40, which in the exemplary embodiment shown is of V-shaped design. The partition wall 40 subdivides the interior 41 of the housing 11 above the plate convectors 33 along the longitudinal axis 10 into two separate sub-areas 42. In this way, the air flow generated by the two fans 39 of each half of the housing 11 cannot overflow from one half of the housing 11 to the other half. The fans 39 are arranged in the curved top wall 15 such that their rotating impellers 43 are located in a protected manner in the sub-areas 42 of the housing 11. The rear side of the impellers 43 is provided with a protective grating 44 which covers the outside of the housing 11 and by way of which outside air is taken into the housing by the fans 39. This air is led past the plate convectors 33 from the interior 41 and thus heated in stages, to be precise first of all in the top, colder part of the plate convectors 33 and then in the hotter part, located beneath the colder part, of the plate convectors 33.

In the apparatus shown here, the interior 41 of the housing 11 is assigned air-distributing means above the plate convectors 33. In the exemplary embodiment shown, said air-distributing means are two air-distributing plates 45, of which one is accommodated in the respective sub-area 42. In the exemplary embodiment shown, the air-distributing plates 45, which are of identical design and are arranged in a mirror-inverted manner in the housing 11, extend merely over the base panels 17. In the present case, merely part, to be precise approximately two thirds, of the inner base panels 17, which are adjacent on opposite sides of the longitudinal axis 10, is covered over by the respective air-distributing plate 45. The other two base panels 17 which follow on each side of the longitudinal axis 10 are covered over completely by the air-distributing plates 45. The two outer base panels 18, located opposite one another, with the elongate air-outlet slits 28 are not covered over by the air-distributing plate 45. This is not necessary because, in the narrow elongate air-outlet slits 28, the air is automatically distributed to the extent where a continuous air curtain is produced. In the case of the base panels 17, which have a sieve-like grid of air-outlet holes 21, the air-distributing plates 45 result in virtually the same quantity of air passing out of all the air-outlet holes 21, to be precise even the border-side and end-side air-outlet holes 21. This is achieved by perforations in the surfaces of the air-distributing plates 45, the latter being formed, for example, from a perforated plate with a sieve-like arrangement of the uniformly distributed holes. The holes in the air-distributing plates 45 may have any desired surface areas.

The air-distributing plates 45 run parallel to the top side 46 of the plate convectors 33, to be precise at a small distance therefrom in the exemplary embodiment shown. This achieves the situation where the air flowing through the sieve-arrangement holes in the air-distributing plates 45 is evened out again behind the air-distributing plates 45 in order to form a uniform veil of air which flows downwards in a rectified manner over the entire surface of the plate convectors 33 assigned to the base panels 17. Rectified in this context means that the air flow everywhere has approximately the same pressure, the same flow direction and virtually the same flow speed.

In contrast to the exemplary embodiment shown, it is also conceivable for the air-distributing plates to be designed such that they cover over completely all the base panels 17, provided with air-outlet holes 21. It is likewise conceivable for the air-distributing plates 45 also to be arranged in the region of the outer base panels 18 with elongate air-outlet slits 28.

The above described apparatus operates as follows:

Ambient air at room temperature is transported from the fans 39 in the top wall 15 into each of the two sub-areas 42 in the housing 11. The quantity of air taken in is such that in the housing 11, which, apart from the air-outlet holes 21 and the air-outlet slits 28, is of air-tight design, a corresponding (slight) positive pressure builds up.

The air taken in passes, in particular in part, directly to the plate convectors 33 assigned to the outer base panels 16 with elongate air-outlet slits 28. The air only passes to the rest of the plate convectors 33 once it has flowed through the holes of the sieve-design air-distributing plates 45 and has thus evened out on the underside of the air-distributing plates 45, to be precise not just in terms of quantity, but also in terms of the flow direction, the flow speed and the pressure. Having passed the air-distributing plates 45, the evened-out air passes to the plate convectors 33 assigned to the inner base panels 17.

The air is heated in two stages on all the plate convectors 33, that is to say first of all at the top half of the plate convectors 33, which has returning hot medium flowing through it, and then in the bottom regions of the plate convectors 33, which have inflowing and only slightly cooled heat transfer medium flowing through them. The heat exchanger plates of the plate convectors 33 likewise have an evening-out effect on the air flowing past the plate convectors 33.

From the plate convectors 33, the heated air passes into a narrow gap between the undersides 34 of the plate convectors 33 and the insides of the base wall 14 of the housing 11. The heated air passes out through the opposite, outer air-outlet slits 28 of the base panels 18 and forms a hot-air curtain in the process. By virtue of the air-outlet slits 28 being positioned obliquely in the base panels 18, the hot-air curtains are inclined slightly in relation to the vertical, to be precise such that the air curtains passing out of the opposite air-outlet slits 28 converge in the direction of the ground. This produces, between the two outer air curtains, a space which narrows in the direction of the ground. Said space serves as a drying space for the horse in each case. Drying space is applied with hot air which passes out through the air-outlet holes 21 of the base panel 17. By virtue of the sieve-like design of the base surfaces 19 of the base panel 17, a uniform veil of hot air passes out of the bottom of the housing 11. By virtue of the air-outlet holes 21 being designed as nozzles which generate a diffuse hot-air curtain, the air passing out of the air-outlet holes 21 of the base panels 17 fill the drying space, formed between the hot-air curtains, beneath the housing 11 uniformly over the entire surface area. The hot air flowing out of the air-outlet holes 21 flows downwards, guided by the hot-air curtains on opposite longitudinal sides of the apparatus, and is accelerated in the process in the drying space, which narrows in the direction of the ground (as a result of the converging hot-air curtains), with the result that even in the region of the feet of the horse which is to be dried in each case there is still a hot-air flow speed which is sufficient for effective drying.

Since the drying space is only bounded by the hot-air curtains on opposite longitudinal sides of the apparatus, air can pass out of the drying space, formed between the hot-air curtains, by way of the end sides running transversely thereto. In this way, it is possible for air which has accumulated moisture and cooled to pass out of the drying space and for dry hot air to flow into the drying space, out of the air-outlet holes 21, in its place.

The above described apparatus is also suitable for drying other animals such as ponies or the like.

Also, it can be seen by those of ordinary skill in the art that the abovedescribed apparatus may be sized larger or smaller to be suitable for drying animals of all sizes.

The above detailed description of the preferred embodiments and the appended figures are for illustrative purposes only and are not intended to limit the scope and spirit of the invention, and its equivalents, as defined by the appended claims. One skilled in the art will recognize that many variations can be made to the invention disclosed in this specification without departing from the scope and spirit of the invention.

What is claimed is:

1. Apparatus for drying animals, having a housing (11) which has air-outlet openings on an underside (16) and in which there are arranged at least one air-flow generator and at least one air-distributing means being arranged upstream of an air-heater, as seen in the flow direction of the air.

2. Apparatus according to claim 1, characterized in that at least one air heater is arranged in the housing (11).

3. Apparatus according to claim 1, characterized in that the air-distributing means is designed as an air-distributing plate (45) with a multiplicity of air-outlet openings.

4. Apparatus according to claim 3, characterized in that the air-outlet openings are distributed uniformly in the respective air-distributing plate (45).

5. Apparatus according to claim 3, characterized in that the air outlet openings are distributed uniformly in the respective air-distributing plate (45).

6. Apparatus according to claim 1, characterized in that the underside (16) of the housing (11) has different air-outlet openings.

7. Apparatus according to claim 1, characterized in that the underside (16) of the housing (11) is of arcuate design in the transverse direction of the same.

8. Apparatus according to claim 1, characterized in that the at least one air-flow generator is designed as fans (39) which are assigned to the top side of the housing (11).

9. Apparatus for drying animals, having a housing (11) which has air-outlet openings on an underside (16) and in which there are arranged at least one air-flow generator and at least one air-distributing means, characterized in that regions of opposite longitudinal borders of a base wall (14) of the housing (11), said base wall forming the underside (16) of the housing (11), have at least in each case one air-outlet opening designed as an air-outlet slit (28).

10. Apparatus according to claim 9, characterized in that, between the opposite air-outlet slits (28), the base wall (14) of the housing (11) has a multiplicity of air-outlet openings designed as air-outlet holes (21).

11. Apparatus according to claim 10, characterized in that the air-outlet holes (21) are distributed in a grid-like manner in an inner region of the base wall (14).

12. Apparatus according to claim 9, characterized in that the air-outlet slits (28) are designed as nozzles.

13. Apparatus according to claim 11, characterized in that the air-outlet holes (28) are designed as nozzles.

14. Apparatus according to claim 9, characterized in that the air-outlet slits (28) are lateral and are designed as flat-jet nozzles in order to generate a thin air curtain on opposite longitudinal sides of the housing (11).

15. Apparatus according to claim 11, characterized in that the air-outlet holes (21) are designed for generating a diffuse air jet.

16. Apparatus according to claim 9, characterized in that the air-outlet slits (28) are enclosed by a surrounding air-directing wall.

17. Apparatus according to claim 11, characterized in that the air-outlet holes (21) are of a substantially funnel shaped design.

18. Apparatus according to claim 11, characterized in that a convector is assigned to each of the air-outlet holes (21), and each convector is arranged at least in part in a common chamber within the housing (11).

19. Apparatus according to claim 11, characterized in that the at least one air-flow generator is arranged above the air-distributing means.

20. Apparatus for drying animals, having a housing (11) which has air-outlet openings on an underside (16) and in which there are arranged at least one air-flow generator and at least one air-distributing means, characterized in that at least one air heater is arranged in the housing (11) and in that the at least one air heater is designed as convectors.

21. Apparatus according to claim 20, characterized in that the air-outlet slits (28) are designed as nozzles.

22. Apparatus according to claim 20, characterized in that the convectors are arranged above at least the air-hole outlet holes (21).

23. Apparatus according to claim 20, characterized in that the air-distributing means are arranged above the convectors.

24. Apparatus according to claim 20, characterized in that the flowing air generated by the at least one air-flow generator flows through the air-distributing means to at least some of the convectors.

25. Apparatus according to claim 20, characterized in that the convectors are arranged in parallel for the supply with the heat transfer medium and for discharging the cooled heat transfer medium.

26. Apparatus according to claim 20, characterized in that the heat transfer medium can be fed to the bottom region of the convectors, and the cooled heat transfer medium is led away via a top region of the convectors.

27. Apparatus for drying animals, having a housing (11) which has air-outlet openings on an underside (16) and in which there are arranged at least one air-flow generator and at least one air-distributing means, characterized in that the at least one air-flow generator is designed as fans (39) and is arranged separately from the housing (11), outside the region of the housing (11), and are connected to the housing (11) via air-feed ducts.

28. Apparatus for drying animals, having a housing (11), having means which are arranged in the housing (11) and are intended for generating an air stream, and having air-outlet openings in an underside (16) of the housing (11), air which passes out of the air-outlet openings forming, beneath the housing (11), a drying space for the animal which is to be arranged at least in part beneath the housing (11), characterized in that the drying space is bounded by air curtains on at least two opposite sides.

29. Apparatus according to claim 28, characterized in that the air curtains are lateral and converge in the direction of the ground.

30. Apparatus for drying animals, with a housing (11) that has air-outlet openings on an underside (16) and contains at least one air-flow generator, at least one air heater and at least one air distributing means, with the at least one air-distributing means being arranged upstream of the at least one air heater as seen in the direction of air flow.

31. Apparatus for drying animals with a housing (11) that has differing air-outlet openings on an underside (16) and contains at least one air-flow generator and at least one air-distributing means.

32. Apparatus for drying animals with a housing (11) that has air-outlet openings on an underside (16) and contains at least one air-flow generator and at least one air-distributing means, wherein regions of opposite longitudinal borders of a base wall (14) at the underside (16) of the housing (11) have at least in each case one air-outlet opening configured as an air-outlet slit.

33. Apparatus for drying animals, with a housing (11), means arranged in the housing (11) for generating an air stream, and with air-outlet openings in an underside (16) of the housing (11), with air passing out of the air-outlet openings forming, beneath the housing (11), a drying space for the animal which is to be located at least in part beneath the housing (11), said drying space being bounded on at least two opposite sides by air curtains.

* * * * *